United States Patent
Bowman et al.

(10) Patent No.: US 12,293,538 B2
(45) Date of Patent: May 6, 2025

(54) COMPUTER VISION CLASSIFIER DEFINED PATH PLANNING FOR UNMANNED AERIAL VEHICLES

(71) Applicant: Tomahawk Robotics, Inc., Melbourne, FL (US)

(72) Inventors: William S. Bowman, Melbourne, FL (US); Mark B. Moffett, Grant, FL (US); Andrew D. Falendysz, Grant, FL (US); Michael E. Bowman, Satellite Beach, FL (US); Michael W. Holt, Smyrna, GA (US); Timothy M. Williams, Indialantic, FL (US); Matthew R. Danko, Melbourne, FL (US); Matthew D. Summer, Melbourne, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 69 days.

(21) Appl. No.: 18/446,450

(22) Filed: Aug. 8, 2023

(65) Prior Publication Data
US 2025/0054175 A1 Feb. 13, 2025

(51) Int. Cl.
*G06T 7/70* (2017.01)
*G06T 7/50* (2017.01)
*G06T 7/90* (2017.01)

(52) U.S. Cl.
CPC ............ *G06T 7/70* (2017.01); *G06T 7/50* (2017.01); *G06T 7/90* (2017.01);
(Continued)

(58) Field of Classification Search
CPC .... G06T 7/70; G06T 7/50; G06T 7/90; G06T 2207/10024; G06T 2207/10028; G06T 2207/10032; G06T 2207/20081
See application file for complete search history.

(56) References Cited

U.S. PATENT DOCUMENTS 9,852,645 B2 * 12/2017 Wright ............... H04N 7/183
11,912,432 B2 * 2/2024 Jones ................. G08G 5/0013
(Continued)

FOREIGN PATENT DOCUMENTS

KR    101348798 B1    1/2014
KR    102289752 B1    8/2021

OTHER PUBLICATIONS

Haojie Li et al., "Object Detection Based on Color and Shape Features for Service Robot in Semi-Structured Indoor Environment," International Journal of Intelligent Robotics and Applications, Nov. 12, 2019, pp. 430-442, vol. 3.
(Continued)

*Primary Examiner* — Boubacar Abdou Tchoussou
(74) *Attorney, Agent, or Firm* — Perkins Coie LLP

(57) ABSTRACT

Methods and systems are described herein for enabling aerial vehicle navigation in GPS-denied areas. The system may use a camera to record images of terrain as the aerial vehicle is flying to a target location. The system may then detect (e.g., using a machine learning model) objects within those images and compare those objects with objects within an electronic map that was loaded onto the aerial vehicle. When the system finds one or more objects within the electronic map that match the objects detected within the recorded images, the system may retrieve locations (e.g., GPS coordinates) of the objects within the electronic map and calculate, based on the coordinates, the location of the aerial vehicle. Once the location of the aerial vehicle is determined, the system may navigate to a target location or otherwise adjust a flight path of the aerial vehicle.

18 Claims, 6 Drawing Sheets

(52) U.S. Cl.
CPC .............. *G06T 2207/10024* (2013.01); *G06T 2207/10028* (2013.01); *G06T 2207/10032* (2013.01); *G06T 2207/20081* (2013.01)

(56) References Cited

U.S. PATENT DOCUMENTS

| | | | |
|---|---|---|---|
| 12,154,440 B2 * | 11/2024 | Stein | .................... G08G 5/0008 |
| 2016/0012289 A1 | 1/2016 | Petit | |
| 2017/0053536 A1 * | 2/2017 | Wright | ...................... G01S 5/16 |
| 2022/0050459 A1 | 2/2022 | Griffin et al. | |
| 2022/0185499 A1 * | 6/2022 | Jones | .................... B64U 10/25 |
| 2023/0400327 A1 * | 12/2023 | Streem | .................... G06V 10/56 |
| 2024/0194081 A1 * | 6/2024 | Hammond | ............ G06V 20/176 |
| 2024/0359822 A1 * | 10/2024 | Kawamura | ............. B64D 45/08 |
| 2024/0385333 A1 * | 11/2024 | Tel Oren | ................. G01S 13/78 |

OTHER PUBLICATIONS

International Search Report and Written Opinion issued in corresponding International Application No. PCT/US2024/041348 on Nov. 7, 2024 (12 pages).

\* cited by examiner

| Object_ID | Location | Representation |
|---|---|---|
| Obj_121 | Latitude, Longitude | <Representation_1> |
| Obj_122 | Latitude, Longitude | <Representation_2> |
| Obj_123 | Latitude, Longitude | <Representation_3> |

FIG. 4

COMPUTER VISION CLASSIFIER DEFINED PATH PLANNING FOR UNMANNED AERIAL VEHICLES

BACKGROUND

Stable and reliable robotic systems are becoming increasingly common, which has contributed to the recent advancement and proliferation of unmanned system technologies. In many instances, these systems are equipped with recording devices (e.g., video, infrared, heat, audio, point cloud, and/or other recording devices). Generally, unmanned systems (e.g., unmanned aerial vehicles) are able to navigate using operator commands and/or use a global positioning system (GPS) to autonomously navigate to target locations. These unmanned systems are designed to hold programming that enables the unmanned system to receive a GPS signal, determine its location based on the GPS signal, and then navigate to a target location based on the combination of its location and the target location. However, in some instances, GPS navigation may not be available. For example, satellite signals may be prone to interference, spoofing, and/or other issues. Accordingly, there may be areas where GPS navigation is denied. In these instances, a different method of navigating is desirable.

SUMMARY

Therefore, methods and systems are described herein for enabling aerial vehicle navigation in GPS-denied areas. For example, a navigation system may be used to perform the operations described herein. The navigation system may reside on an aerial vehicle (e.g., a computer system hosted on an unmanned aerial vehicle). The navigation system may use a camera to record images of terrain as the aerial vehicle is flying to a target location. The navigation system may then detect (e.g., using a machine learning model) objects within those images and compare those objects with objects within an electronic map that was loaded onto the aerial vehicle. When the navigation system finds one or more objects within the electronic map that match the objects detected within the recorded images, the navigation system may retrieve locations (e.g., GPS coordinates) of the objects within the electronic map and calculate, based on the coordinates, the location of the aerial vehicle. Once the location of the aerial vehicle is determined, the navigation system may navigate to a target location or otherwise adjust a flight path of the aerial vehicle.

In some embodiments, the navigation system may perform the following operations when navigating in GPS-denied areas. The navigation system may receive an image recorded by a camera on board an aerial vehicle. The image may show terrain below the aerial vehicle. For example, the aerial vehicle may be equipped with a camera that is enabled to record images of objects below the aerial vehicle as the aerial vehicle is flying. The image may include objects such as bridges, buildings, docks, tree formations, and/or other landmarks that may be assigned a location (e.g., a latitude and a longitude). The navigation system may instruct the camera to record images with a particular frequency, for example, as often as one second or as seldom as one or more hours, depending on how long the aerial vehicle is to fly. In some embodiments, the rate of recording images may depend on how close to the desired course the vehicle is flying, any weather effects (e.g., rain, wind, etc.), and/or based on other factors. In some embodiments, the navigation system may initiate image recording based on the determination that the GPS navigation has become unavailable.

When the image or images are collected, the navigation system may attempt to identify any known objects within those images. In particular, the navigation system may input the image into a machine learning model to detect a first plurality of objects with the image. The machine learning model may have been trained to detect objects within received images. For example, the machine learning model may use the pixels within the image and identify objects based on the shapes/colors that the pixels create. The output of the machine learning model may include, for each object, a corresponding shape representing each object and one or more colors representing pixels of each object. In some embodiments, the output may include a probability of whether an object was detected. In yet some embodiments, a heuristic algorithm may be used to identify objects.

The navigation system may then try to match the identified objects with objects within an electronic map. In particular, the navigation system may retrieve an electronic map that includes a second plurality of objects. Each object within the second plurality of objects may be associated with a location (e.g., with a latitude and a longitude). In some embodiments, each object may be represented by a corresponding stored shape and a corresponding stored one or more colors. For example, the object may be a rectangle with particular dimensions with a particular set of colors. In some embodiments, the electronic map may store images of objects and the navigation system may receive, as output of the machine learning model, portions of images (e.g., with bounding boxes) representing objects.

The navigation system may then attempt to match objects within the image or images with objects within the electronic map. Thus, the navigation system may determine whether one or more objects within the first plurality of objects match the one or more objects within the second plurality of objects. For example, the navigation system may compare shapes and colors of various objects detected with the image or images with shapes and colors of objects within the electronic map. In some embodiments, the navigation system may use a machine learning model to perform similarity matches between objects within the image or images and objects within the electronic map. For example, the navigation system may input images of two objects (one from the image and one from the electronic map) to determine whether those correspond to the same object (e.g., what is a degree of similarity between those objects). The degree of similarity may be a probability whether the two objects are the same object.

The navigation system may then attempt to determine the location of the aerial vehicle based on the identified objects. In particular, in response to determining that the one or more objects within the first plurality of objects match the one or more objects within the second plurality of objects, the navigation system may determine, based on object locations for the one or more objects, a vehicle location for the aerial vehicle. For example, the navigation system may select one or more objects and determine their distance from those objects and then calculate a horizontal distance to then calculate its own location within three-dimensional space. In some embodiments, the navigation system may locate the object closest to its position and then navigate the aerial vehicle to that object. Once the aerial vehicle is at the object, the navigation system may retrieve the stored location of that object (e.g., a latitude and a longitude) and set that location as its own location.

The navigation system may then use the determined location as a starting point to the target location. Thus, the navigation system may generate a flight instruction based on the vehicle location and a target location. For example, the navigation system may determine the direction to the target location from the current identified location and then instruct the aerial vehicle to fly in that direction. In some embodiments, the navigation system may also determine the distance to the target location and then select a speed based on the distance, for example, in order to arrive at the location at a particular time. In some embodiments, the navigation system may repeat this process at a particular frequency for navigating to the target location.

In some embodiments, the navigation system may use this process to generate the electronic map. For example, when GPS navigation is available, the navigation system may record images of terrain as the aerial vehicle flies to a target location. As the navigation system detects objects within images, the navigation system may identify (e.g., using GPS) coordinates of those objects and put those coordinates into the map. In some embodiments, the machine learning model may output colors and shapes for the objects as object identifiers to link to a corresponding location.

In some embodiments, the disclosed process may be used to determine whether a GPS signal is being spoofed. GPS signal spoofing may be a tool used to confuse or destroy an aerial vehicle. For example, if the GPS signal is crafted with spoofed data, an aerial vehicle may be guided in the wrong direction and wrong target location. In another example, if the wrong altitude is derived from a spoofed GPS signal, the aerial vehicle may be destroyed (e.g., crashed into the ground or into water). Thus, in some embodiments, the navigation system may identify objects within the image and then determine the location of the aerial vehicle. Once the location is identified, the navigation system may compare the identified location with the location determined based on the GPS signal. If the locations match, the navigation system may determine that the GPS signal is genuine.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 illustrates an excerpt of a data structure that may store electronic map information, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
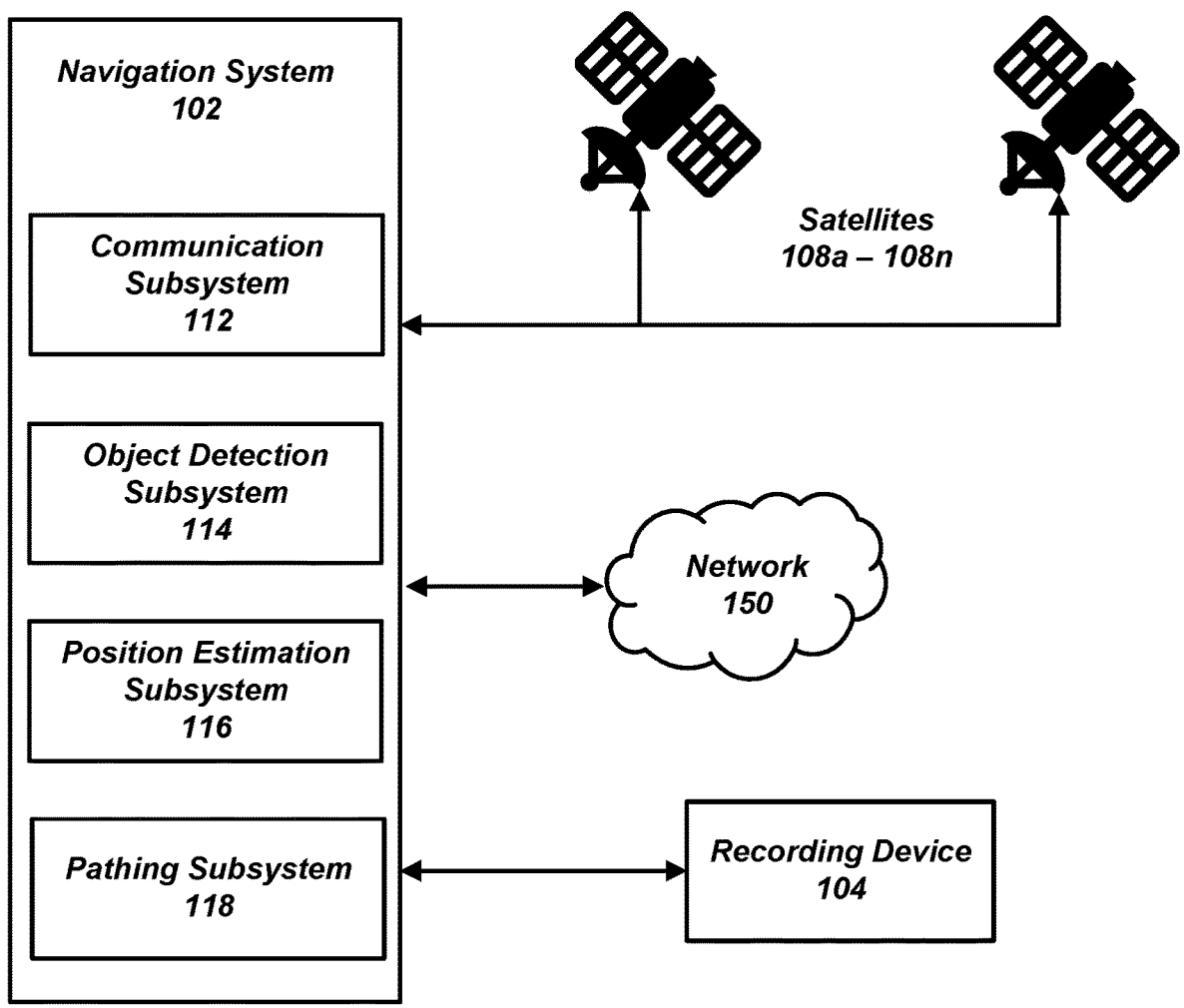
FIG. 1 shows an illustrative system for navigating in GPS-denied areas, in accordance with one or more embodiments of this disclosure.

FIG. 1 is an example of environment 100 for navigating in GPS-denied areas and detecting GPS spoofing. Environment 100 includes navigation system 102, recording device 104, and satellites 108a-108n. Navigation system 102 may execute instructions for navigating in GPS-denied environments and detecting GPS spoofing. Navigation system 102 may include software, hardware, or a combination of the two. Navigation system 102 may be hosted on an aerial vehicle. Although this disclosure discusses usage of this navigation system at an unmanned vehicle, the disclosed navigation system may be used on manned vehicles. Although this disclosure discusses various operations in view of an unmanned aerial vehicle recording images of terrain below the aerial vehicle, this process may also be used by watercraft to navigate in the water using sonar technologies and sonar maps.

Recording device 104 may be any kind of image recording device. For example, a recording device may be a camera that is able to record images of terrain below the unmanned vehicle. In some embodiments, the recording device may be an infrared camera or a night vision camera enabling better navigation during nighttime. Thus, recording device 104 may be any device that is able to record images such that those images may be processed by a machine learning model to identify objects within the images. Recording device 104 may include software, hardware, or a combination of the two. For example, the camera may include lenses, focusing mechanisms, etc., with software to drive those hardware components. Network 150 may be a local area network, a wide area network (e.g., the Internet), or a combination of the two. Satellites 108a-108n may be satellites providing GPS signals for use during GPS navigation and may be used during electronic mapping operations and/or while detecting GPS spoofing. In some embodiments, the recording device may be a sonar recording sound signals from various points on the sea floor.

Navigation system 102 may receive an image recorded by a camera on board an aerial vehicle. The image may show terrain below the aerial vehicle. The image may be recorded by recording device 104 and transmitted to the navigation system via a wired connection between the recording device and the navigation system. In some embodiments, the connection between navigation system 102 and recording device 104 may be a wireless connection. Both the navigation system and the recording device may be hosted on an unmanned aerial vehicle. Navigation system 102 may receive the image and the image metadata using communication subsystem 112. Communication subsystem 112 may include software components, hardware components, or a combination of both. For example, communication subsystem 112 may include a network card (e.g., a wired/wireless network card/processor) that is coupled with software to drive the card/processor. Communication subsystem 112 may pass each image or a pointer to an address in memory to object detection subsystem 114. In some embodiments, the camera may be an infrared camera or another suitable camera system. In some embodiments, instead of images, navigation system 102 may receive sonar data from a sonar getting information from a sea floor. The sonar data may represent an image of the sea floor similar to the recorded image representing the terrain below an aerial vehicle.

Figure 2:
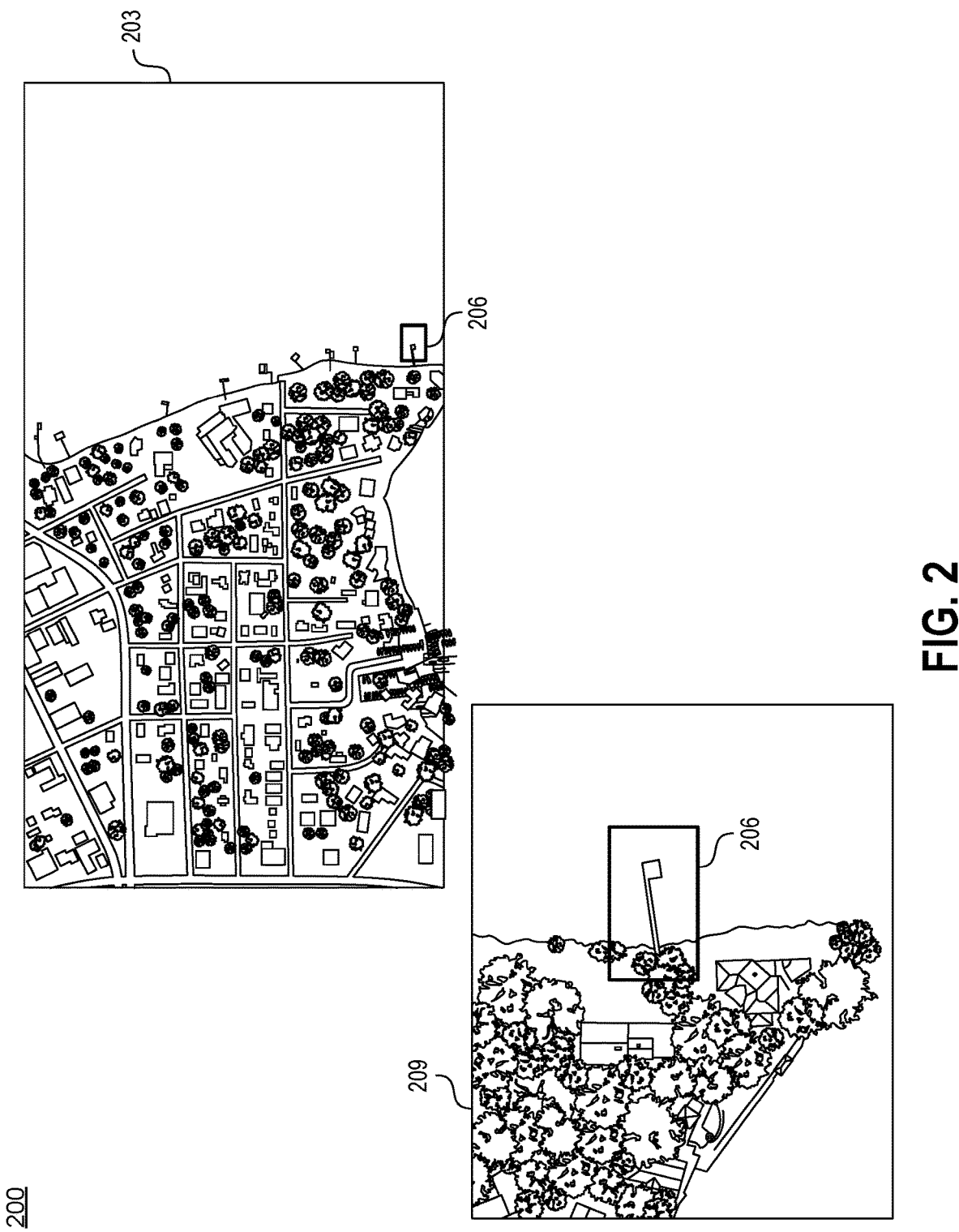
FIG. 2 illustrates excerpts from an image that shows various identifiable objects, in accordance with one or more embodiments of this disclosure.

FIG. 2 illustrates excerpts from image 200 that show various identifiable objects within the terrain below an aerial vehicle. Excerpt 203 shows a terrain that includes land and water areas with some man-made objects, with one of the objects being highlighted. Objects may be detected by a machine learning model as described below. Excerpt 209 shows a smaller area of the terrain (e.g., zoomed in to a portion of excerpt 203) highlighting the same object. In the example of object 206, that object is a dock. However, other objects may be detected in images, including houses, fields, hills, etc.

Object detection subsystem 114 may include software components, hardware components, or a combination of both. Object detection subsystem 114 may input the image into a machine learning model to detect a first plurality of objects with the image. The machine learning model may be trained to detect objects within received images. In some embodiments, the machine learning model may output one or more bounding boxes (e.g., as illustrated in FIG. 2) corresponding to the detected images. The bounding boxes may include coordinates (e.g., X-Y coordinates) within an image where each bounding box is to be located. The X-Y coordinates may be offsets of a number of pixels starting from the upper left corner of the image. The X coordinate may be a number of pixels offset horizontally, while the Y coordinate may be a number of pixels offset vertically. In some embodiments, the machine learning model may output a corresponding shape representing each object and one or more colors representing pixels of each object. For example, object detection subsystem 114 may receive one or more outputs from the machine learning model for one or more detected objects. Each output may be associated with a group of pixel colors and one or more shapes. For example, the dock highlighted in FIG. 2 may be represented by its shape and one or more colors associated with the dock's pixels.

In some embodiments, the machine learning model may output vectorized objects that have been detected within the image. For example, the machine learning model may detect objects within certain portions of the image and then select those portions. Each portion may be vectorized (e.g., using a vectorization machine learning model). Thus, the output of the machine learning model may be one or more vectors representing one or more objects. The vectors may be unique such that each object is represented by a different vector. The vectorization machine learning model may generate vectors based on, for example, pixel colors associated with the object, shapes associated with the object, distance to the object, and/or other suitable parameters.

Figure 3:
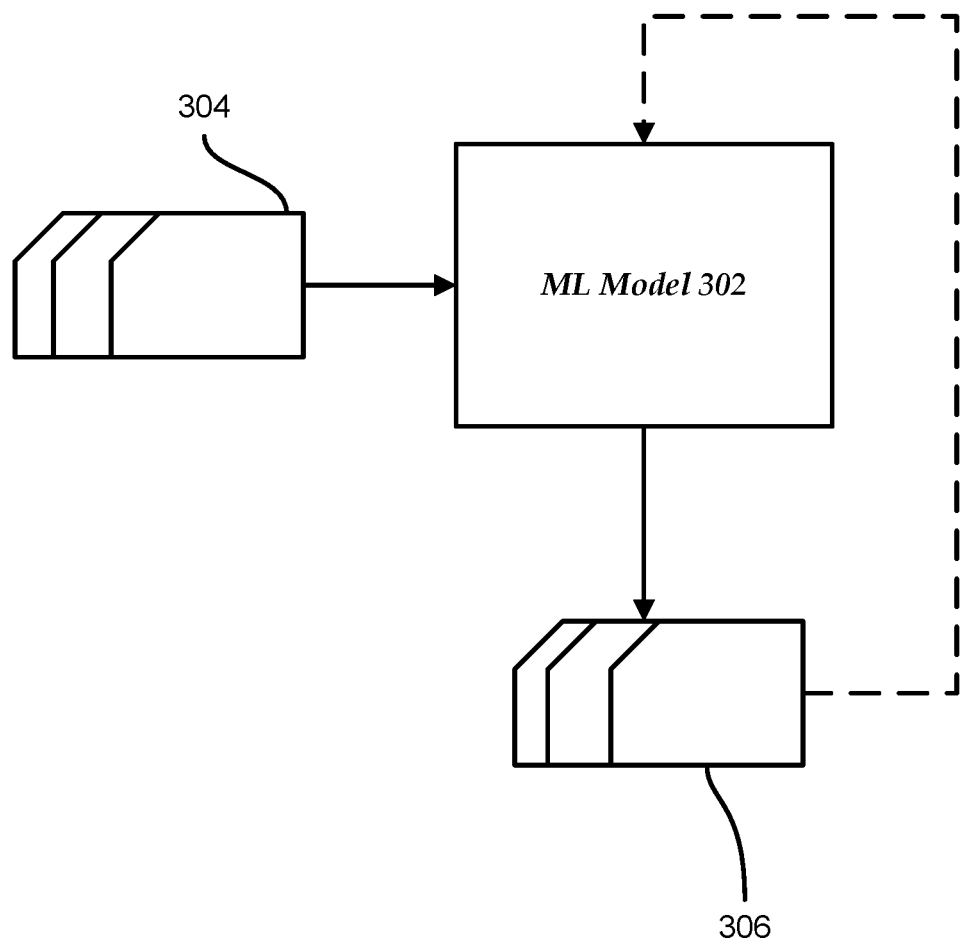
FIG. 3 illustrates an exemplary machine learning model, in accordance with one or more embodiments of this disclosure.

The machine learning model used in connection with this disclosure may take many forms. FIG. 3 illustrates an exemplary machine learning model. Machine learning model 302 may take input 304 (e.g., one or more images) and may output 306 object identifiers, vectorized objects, or other suitable object representations of objects within those one or more images. In some embodiments, the machine learning model may output a probability that the object has been detected and the area (e.g., a box) where the object was detected within the image. The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Object detection subsystem 114 may retrieve an electronic map that includes a second plurality of objects. Each object may be associated with a location. For example, each object may be associated with a latitude and a longitude. In addition, each object may be represented by a corresponding stored shape and a corresponding stored one or more colors. In some embodiments, the electronic map may include a plurality of images of different areas along a flight path of the aerial vehicle. The images may be loaded onto a memory of the aerial vehicle prior to a mission. Depending on the amount of memory available, a different number of map images may be loaded onto the aerial vehicle. Each image may have associated metadata. The metadata may include object locations (e.g., object coordinates) within each image as well as three-dimensional coordinates (e.g., latitude and longitude) of those objects. In some embodiments, the metadata may include the altitude or height of those objects. For example, if an object is a mountain or a forest, it may be useful to understand the altitude of the object. For watercraft and underwater vehicles, the electronic map may be images of terrain below the water.

In some embodiments, in addition or instead of storing the images, object detection subsystem 114 may store vectorized objects associated with each image. For example, when the images are loaded into memory of the aerial vehicle, the images may be input into a machine learning model such that the machine learning model may output vectors (e.g., vectorized objects) representing the objects within the map images. Object detection subsystem 114 may then generate for each map image a data structure with associated objects. FIG. 4 illustrates an excerpt of a data structure 400 that may store electronic map information. Field 403 may include an object identifier, while field 406 may include the location of the object (e.g., latitude and longitude). In some embodiments, field 406 may store an altitude corresponding to how tall the object is in relation to sea level. Field 409 may store a representation of the object. In some embodiments, the representation of the object may be a portion of the map that shows that object (e.g., an object within a bounded box). In some embodiments, the representation of the object may be a vectorized portion of the image. Other types of object representations may be stored in field 409 (e.g., shape, color, etc.).

Based on the objects within the image and the objects within the map, object detection subsystem 114 may determine whether any objects match. Thus, object detection subsystem 114 may determine whether one or more objects within the first plurality of objects match the one or more objects within the second plurality of objects. In some embodiments, object detection subsystem 114 may make the determination based on color and shape of each corresponding object. For example, object detection subsystem 114 may compare the shapes and colors of objects within the electronic map with objects within the recorded image or images to identify matching objects. In some embodiments, object detection subsystem 114 may perform the comparison while accounting for the difference in colors based on time of day. For example, object detection subsystem 114 may normalize the colors based on time of day to determine whether there is a match.

In some embodiments, object detection subsystem 114 may use a machine learning model to perform the comparisons. For example, if the map objects and the objects detected within the image are vectorized representations of the objects, object detection subsystem 114 may input object pairs into a machine learning model to perform vector comparison. The result of vector comparison may be an output indicating a match or no match. In some embodiments, the output of the machine learning model may be a probability of a match. Thus, object detection subsystem 114 may determine a match based on the probability as compared to a probability threshold. In some embodiments, there may be probabilities for multiple matches. For example, one object in the image may have probabilities of matches with several objects within the map. Thus, object detection subsystem 114 may select the highest probability of match. In some embodiments, the image recorded from the aerial vehicle may include multiple objects that may match map objects. Thus, object detection subsystem 114 may store a data structure that includes objects within the image and the matching objects within the electronic map.

In some embodiments, object detection subsystem 114 may use object clusters as objects. In particular, object detection subsystem 114 may detect, within the image using the machine learning model, a cluster of objects within a corresponding location within the image. For example, a cluster of objects may be trees within a particular tree formation that has a specific shape that may be differentiated from other tree formations. In another example, a cluster of objects may be a specific land formation (e.g., a set of small hills). Thus, the machine learning model may be trained on object clusters in the same way as it may be trained on objects.

Object detection subsystem 114 may compare each object within the cluster of objects with each object within the electronic map. Object detection subsystem 114 may store the object clusters as vectors (e.g., embeddings) so that they may be compared by a machine learning model. Thus, object detection subsystem 114 may input object pairs (e.g., object cluster pairs) into an object matching machine learning model and receive, as output, a determination of whether two objects match and/or a probability that two objects match. Object detection subsystem 114 may then determine, based on comparing each object within the cluster of objects with each object within the electronic map, a matching cluster of map objects. For example, object detection subsystem 114 may compare a tree formation with a tree formation within the electronic map to determine that the two tree formations match.

In some embodiments, object detection subsystem 114 may retrieve the object locations of the matching objects to determine the location of the aerial vehicle within three-dimensional space. Thus, in response to determining that the one or more objects within the first plurality of objects match the one or more objects within the second plurality of objects, object detection subsystem 114 may retrieve object locations for the one or more objects. As discussed above, the object locations may be the longitude and the latitude of each object on the electronic map and the object locations may be used to determine the location of the aerial vehicle.

Object detection subsystem 114 may pass the object locations of the image and/or other object information to position estimation subsystem 116. Position estimation subsystem 116 may include software components, hardware components, or a combination of both. For example, position estimation subsystem 116 may include software components that access data in memory and/or storage and may use one or more processors to perform its operations. Position estimation subsystem 116 may estimate the location of the aerial vehicle based on the provided information. Thus, position estimation subsystem 116 may determine, based on the object locations for the one or more objects, a vehicle location for the aerial vehicle. In some embodiments, the vehicle location may be calculated based on a horizontal distance to each object and a corresponding latitude and a corresponding longitude of each object. For example, when the image is recorded by the camera mounted on the aerial vehicle, camera data may be saved as metadata for the image. The camera data may include field of view, zoom settings, and other data that may be used to determine a distance between the camera and each object within the image. Thus, position estimation subsystem 116 may calculate a distance to each object. Based on the distance to each object and the location of that object (e.g., a latitude and a longitude), position estimation subsystem 116 may determine the position of the aerial vehicle.

In some embodiments, position estimation subsystem 116 may, in response to determining that the one or more objects within the first plurality of objects match the one or more objects within the second plurality of objects, determine, based on object locations for the one or more objects, a vehicle location for the aerial vehicle. Thus, to determine vehicle location, position estimation subsystem 116 may retrieve the camera data and calculate the distance from the camera to a particular object. Position estimation subsystem 116 may also determine the altitude of the aerial vehicle. Based on the distance and the altitude, position estimation subsystem 116 may determine a horizontal distance between the aerial vehicle and the object or multiple objects detected within the image. In some embodiments, position estimation subsystem 116 may use triangle formulas and concepts to determine the horizontal distance. When the horizontal distance is determined, position estimation subsystem 116 may use the horizontal distance and the location of the object retrieved from the electronic map to determine the location of the aerial vehicle.

In some embodiments, position estimation subsystem 116 may use multiple detected objects within the image to calculate the location of the aerial vehicle. In some embodiments, position estimation subsystem 116 uses distances to triangulate the vehicle location. For example, position estimation subsystem 116 may determine a horizontal distance from multiple objects to calculate the location more accurately. In particular, position estimation subsystem 116 may use the latitude and the longitude of each object to determine the latitude and the longitude of the aerial vehicle. Accordingly, position estimation subsystem 116 may determine the vehicle location by calculating the vehicle location based on a horizontal distance of the aerial vehicle to each object and a corresponding latitude and a corresponding longitude of each object. In some embodiments, position estimation subsystem 116 may use a similar method to determine the altitude of the aerial vehicle. Position estimation subsystem 116 may use a similar method to determine a distance for a watercraft or an underwater vehicle. In some embodiments, position estimation subsystem 116 may use sonar data instead of camera data and sonar output instead of images.

When position estimation subsystem 116 determines the location of the aerial vehicle, position estimation subsystem 116 may pass that information to pathing subsystem 118. Pathing subsystem 118 may include software components, hardware components, or a combination of both. For example, pathing subsystem 118 may include software components that access data in memory and/or storage and may use one or more processors to perform its operations. Pathing subsystem 118 may use the location of the aerial vehicle to generate a new or an updated flight path. In particular, pathing subsystem 118 may generate a flight instruction based on the vehicle location and a target location. For example, the aerial vehicle may be tasked with flying to a particular location, surveying that location, and flying back to the point of origin. The area where the aerial vehicle may be traveling may not have an available global positioning system (GPS) for navigation. Thus, the aerial vehicle may fly through a GPS-denied area such that GPS may not be available in that area or GPS may be spoofed in that area. Thus, when navigation system 102 determines the location of the aerial vehicle, pathing subsystem 118 may determine whether the aerial vehicle should change course.

In some embodiments, pathing subsystem 118 may perform the following operations when generating a flight instruction. Pathing subsystem 118 may access a flight path for the aerial vehicle. The flight path may include a set of objects within the electronic map. For example, when the aerial vehicle is tasked with a mission, pathing subsystem 118 may receive a flight path for the aerial vehicle, and the flight path may include a number of objects within the electronic map. Each object may be a waypoint within the flight path. In some embodiments, instead of the set of objects, the flight path may include a distance and direction from each object to the target location or a distance and direction to the next object or location within the flight path.

Pathing subsystem 118 may then determine one or more map objects that correspond to the one or more objects. For example, pathing subsystem 118 may identify two objects within the image that match objects within the flight path. As discussed above, navigation system 102 may match objects within the image with objects within the electronic map. Once the objects are matched, pathing subsystem 118 may determine whether any of the matched objects match objects within the flight path. For example, the flight path may be a data structure that stores object identifiers of objects within the electronic map. Thus, pathing subsystem 118 may compare object identifiers to determine whether any matching objects are objects within the flight path.

Pathing subsystem 118 may then identify, based on the one or more map objects, a next object in the flight path. For example, as the flight path may be a data structure of objects, those objects may be stored in order such that once a particular object has been reached, the next object would be another waypoint on the way to the target location. Thus, one object within the image may be matched to an object within the flight path. When the object is matched, pathing subsystem 118 may perform a lookup as to the next object in the path and a location of the next object relative to the detected object. In some embodiments, when multiple objects of the flight path are detected within the image, pathing subsystem 118 may select the object that is later in the flight path.

Pathing subsystem 118 may then instruct the aerial vehicle to navigate to the next object. In some embodiments, the aerial vehicle may not be exactly above the detected object but may be some distance away. Thus, pathing subsystem 118 may calculate the flight instruction from that location that is some distance away. In some embodiments, pathing subsystem 118 may first instruct the aerial vehicle to navigate to the detected object that is within the set of objects within the flight path. Once the aerial vehicle is above the object, pathing subsystem 118 may retrieve a pre-stored instruction to navigate to the next object within the flight path. That is, in this case, there may be pre-stored instructions for navigating between objects within the flight path. Storing such instructions (instead of performing calculations on the fly) may save power and/or processing time, allowing the aerial vehicle to fly further and more efficiently.

In some embodiments, the flight path may include object clusters. Thus, pathing subsystem 118 may perform the following operations when identifying, based on the one or more map objects, the next object in the flight path. Pathing subsystem 118 may match the one or more map objects of the matching cluster of map objects with one or more flightpath objects. As discussed above, the object cluster may be matched using a machine learning model that accepts, as input, two objects (or object clusters) represented using a vector (e.g., an embedding sometimes referred to as an embedding vector). Pathing subsystem 118 may determine the next object based on an indication of a following object within the one or more flightpath objects. As discussed above, the flight path may include a data structure with a plurality of object identifiers or other object representations. The data structure may indicate a next object in the flight path. Thus, pathing subsystem 118 may retrieve an identifier of the next object when determining the next object for the flight path.

In some embodiments, navigation system 102 may initiate the process for adjusting flight paths using terrain guidance when GPS navigation is not available. Navigation system 102 may determine, at the aerial vehicle during flight, that a GPS is unavailable. For example, navigation system 102 may be receiving a GPS signal from one or more satellites 108a-108n. Based on the GPS signal, navigation system 102 may navigate to the target location. As navigation system 102 navigates to the target location, navigation system 102 may stop receiving satellite signals (e.g., because of interference such as jamming). Navigation system 102 may therefore determine that GPS navigation is unavailable. Based on determining that the GPS is unavailable, navigation system 102 may position the camera in a downward direction and instruct the camera to initiate image recording. Navigation system 102 may start receiving images from the camera and, based on those images, may determine the location of the aerial vehicle.

In some embodiments, as the aerial vehicle is flying to a target location, navigation system 102 may generate an electronic map using the camera in combination with GPS coordinates. As the aerial vehicle is flying, navigation system 102 may receive a plurality of images recorded by the camera on board the aerial vehicle as the aerial vehicle is flying over a plurality of locations. That is, the camera may record continuously or at a particular interval (e.g., every one second, every ten seconds, or another suitable interval). Navigation system 102 may input the plurality of images (e.g., sequentially or in parallel) into the machine learning model to detect a corresponding plurality of objects with each image. For example, as the images are processed by the machine learning model, navigation system 102 may store detected objects in a data structure. In some instances, objects detected in different images may be the same object (e.g., caused by overlapping images). Thus, navigation system 102 may use a similarity machine learning model to compare objects to ensure that the objects being entered into the data structure are unique and two of the same objects are not added.

Navigation system 102 may determine a corresponding object location of each object within each corresponding plurality of objects. For example, navigation system 102 may calculate a horizontal distance and direction to each object by using camera data (e.g., as described above) to first determine a distance to the object and then determine the altitude of the aerial vehicle. Based on that information, navigation system 102 may determine a horizontal distance and direction to each object. Navigation system 102 may then determine (e.g., via GPS) the coordinates of the aerial vehicle and, based on those coordinates, the horizontal distance and direction determine the location of each object (e.g., a latitude and a longitude). In some embodiments, navigation system 102 may determine elevation or height of each object.

Thus, navigation system 102 may continue performing these operations to build an electronic map of the area. The electronic map may be used to navigate back from the target location or for other missions. In particular, navigation system 102 may generate the electronic map based on each corresponding plurality of objects. In some embodiments, the electronic map may include a corresponding object location of each object, a corresponding object shape associated with each object, and a plurality of colors associated with each object, the plurality of colors representing pixel colors of each corresponding object with the image. In some embodiments, the electronic map may store images captured by the camera with metadata indicating where within each image each object is located and real-world coordinates of the object (e.g., latitude and longitude). In some embodiments, the metadata may include the altitude of each object, indicating the tallest point of each object. In yet some embodiments, the electronic map may be a data structure storing vector representations (e.g., embedding representations) of objects detected within those images and corresponding object locations (e.g., latitude and longitude). For example, FIG. 4 may illustrate an excerpt from an electronic map. Thus, when generating the electronic map, navigation system 102 may use a machine learning model to generate the vectors to be stored as the electronic map.

In some embodiments, navigation system 102 may use the electronic map to determine whether the GPS system is functioning properly or whether it is being spoofed or otherwise inaccurate. For example, certain technologies may be used to spoof GPS signals as to provide inaccurate data to force the aerial vehicle to fly into the ground (e.g., by spoofing signals for calculating altitude). Navigation system 102 may receive, at the aerial vehicle during flight, a GPS signal. This signal may be received from one or more sources and may enable navigation system 102 to determine a candidate position of the aerial vehicle (e.g., position of navigation system 102). The candidate position of the aerial vehicle, according to the source or sources, may be calculated based on the GPS signal.

Navigation system 102 may determine, based on the global positioning signal, a set of objects within the electronic map that are within a threshold distance of the position. For example, a threshold distance may be one mile, five miles, ten miles or another threshold distance. Navigation system 102 may identify the set of objects by performing a lookup (e.g., with the data structure of the electronic map as shown in FIG. 4) for objects that are within the threshold distance. In some embodiments, one object may be used.

Navigation system 102 may then identify the set of objects within an image recorded by the camera. For example, navigation system 102 may perform object comparison, as described above, to determine whether those objects are within the image. In some embodiments, if those objects are not within the image but are expected to be within the image based on the area covered by the image, navigation system 102 may determine that GPS location provided by the one or more sources is inaccurate. That is, navigation system 102 may determine that GPS is being spoofed.

In some embodiments, if the objects are located, navigation system 102 may calculate, using image characteristics and camera characteristics (e.g., camera data described above), a distance from the aerial vehicle to each object within the set of objects. For example, navigation system 102 may use the field of view of the camera to determine the distances. Based on the distance, navigation system 102 may determine aerial vehicle altitude. For example, one or more objects may be a certain distance away. That distance may include a horizontal distance and a vertical distance. In some embodiments, navigation system 102 may use the location of the object within the electronic map and the horizontal distance to determine whether the GPS signal is accurate.

In some instances, the GPS signal may spoof only the altitude (e.g., to fly the aerial vehicle into the ground). Thus, the horizontal distance may be accurate. Accordingly, in some embodiments, navigation system 102 may determine an aerial vehicle altitude based on the horizontal distance and the distance to each object (e.g., triangle-based calculations). Navigation system 102 may then, based on the aerial vehicle altitude and a received altitude associated with the position, determine whether the position is inaccurate. For example, navigation system 102 may calculate, based on the received GPS signal, that the altitude of the aerial vehicle is three hundred feet. However, when using the distance to known object with the horizontal distance, navigation system 102 may calculate the altitude of the aerial vehicle as two hundred feet. Accordingly, navigation system 102 may determine that the GPS signal is being spoofed and the position calculated based on the GPS signal is inaccurate. Therefore, navigation system 102 may stop using GPS navigation.

In some embodiments, instead of performing the calculations described above, navigation system 102 may determine whether the GPS signal is accurate by flying to an object detected within the image and matched to an object within the electronic map. In particular, navigation system 102 may receive, at the aerial vehicle during flight, a GPS signal. The GPS signal may be used to determine a position of the aerial vehicle. For example, navigation system 102 may use known GPS calculations to determine the position of the aerial vehicle. Navigation system 102 may then navigate the aerial vehicle to fly above a first object within the first plurality of objects. For example, navigation system 102 may identify a known object within the vicinity of the aerial vehicle (e.g., within a threshold distance such as five hundred feet, one mile, or another suitable distance).

Navigation system 102 may then determine an object location of the first object. For example, navigation system 102 may retrieve the location of the object from the electronic map as illustrated in FIG. 4. Navigation system 102 may then determine, based on the object location, whether the position is accurate. For example, navigation system 102 may compare the location of the object as calculated based on the GPS signal with the location of the object as determined from the coordinates within the electronic map. If the locations match, navigation system 102 may determine that the GPS signal is accurate. However, if the locations do not match, navigation system 102 may determine that the GPS signal is not accurate.

Computing Environment

Figure 5:
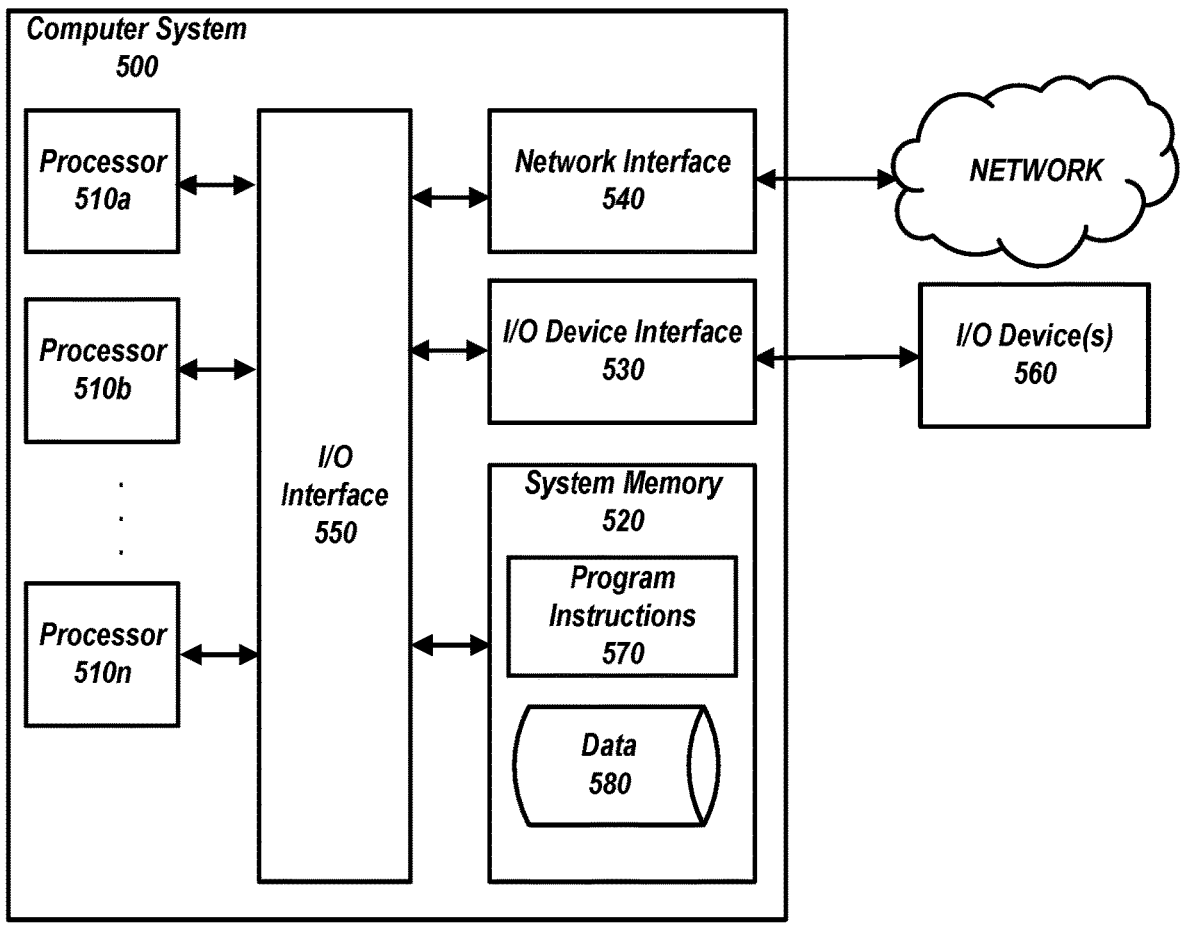
FIG. 5 illustrates a computing device, in accordance with one or more embodiments of this disclosure.

FIG. 5 shows an example computing system that may be used in accordance with some embodiments of this disclosure. In some instances, computing system 500 is referred to as a computer system. The computing system may be hosted on a device (e.g., a smartphone, a tablet, or another suitable device) that an operator may control. In some embodiments, the computing system may be hosted on a server at a datacenter. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a) or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a global positioning system (GPS), or the like. Computer system 500 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 6:
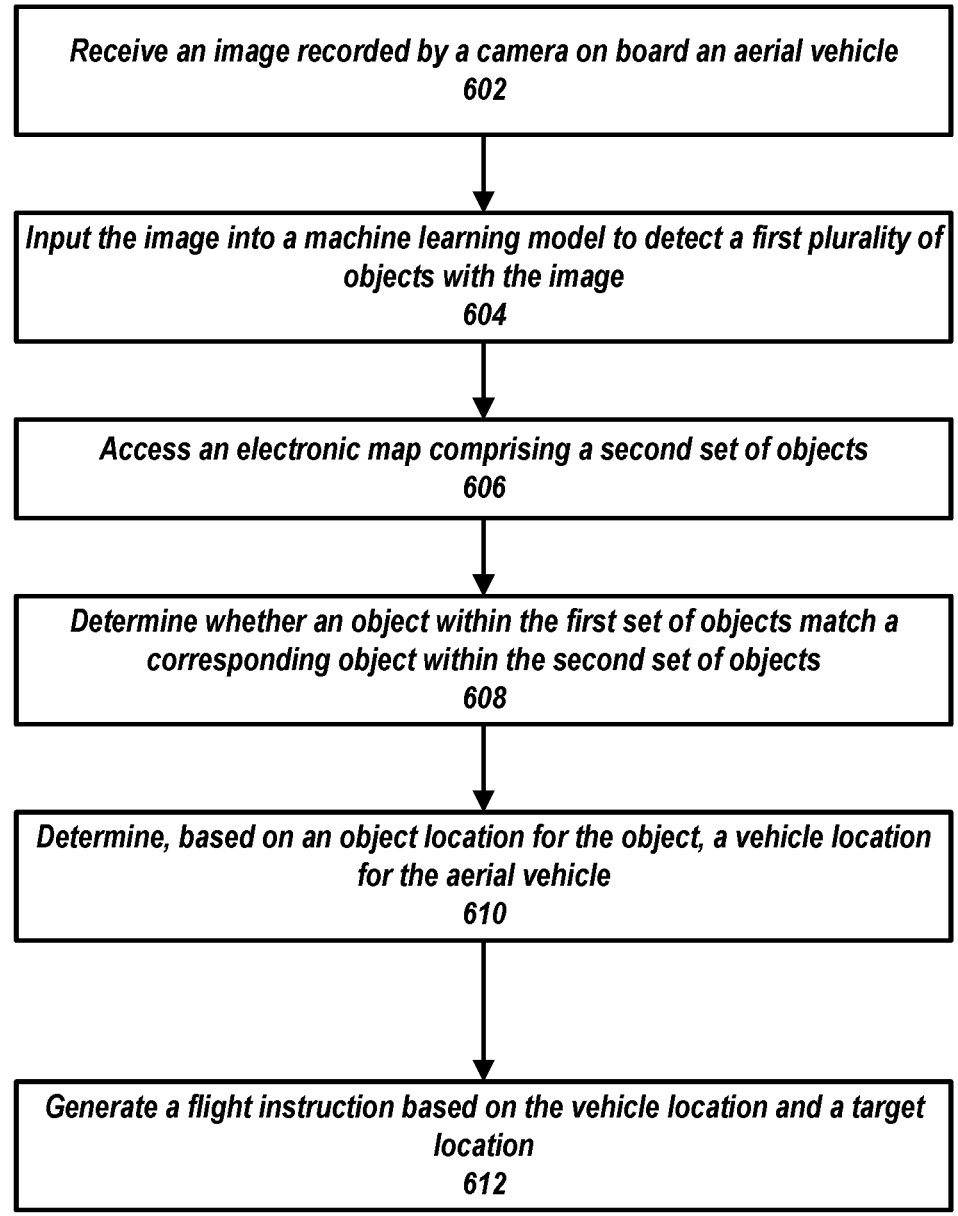
FIG. 6 is a flowchart of operations for navigating in GPS-denied areas, in accordance with one or more embodiments of this disclosure.

FIG. 6 is a flowchart 600 of operations for generating composite frames of objects detected in multiple different types of data streams. The operations of FIG. 6 may use components described in relation to FIG. 5. In some embodiments, navigation system 102 may include one or more components of computing system 500. At 602, navigation system 102 receives an image recorded by a camera on board an aerial vehicle. For example, navigation system 102 may receive the image via I/O device interface 530 through I/O interface 550. At 604, navigation system 102 inputs the image into a machine learning model to detect a first plurality of objects with the image. For example, navigation system 102 may use one or more processors 510a, 510b, and/or 510n to perform the input. At 606, navigation system 102 accesses an electronic map including a second set of objects. For example, navigation system 102 may use one or more processors 510a-510n to access the electronic map in system memory 520.

At 608, navigation system 102 determines whether an object within the first set of objects matches a corresponding object within the second set of objects. Navigation system 102 may perform this operation using one or more processors 510a, 510b, and/or 510n. At 610, navigation system 102 determines, based on an object location for the object, a vehicle location for the aerial vehicle. Navigation system 102 may use one or more processors 510a, 510b, and/or 510n and/or system memory 520 to perform this operation. At 612, navigation system 102 generates a flight instruction based on the vehicle location and a target location. Navigation system 102 may perform this operation using one or more processors 510a, 510b, and/or 510n.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving an image recorded by a camera on board an aerial vehicle, wherein the image shows terrain below the aerial vehicle; inputting the image into a machine learning model to detect a first plurality of objects with the image, wherein the machine learning model is trained to detect objects within received images; retrieving an electronic map comprising a second plurality of objects, wherein each object within the second plurality of objects is associated with a location; determining whether one or more objects within the first plurality of objects match the one or more objects within the second plurality of objects; in response to determining that the one or more objects within the first plurality of objects match the one or more objects within the second plurality of objects, determining, based on object locations for the one or more objects, a vehicle location for the aerial vehicle; and generating a flight instruction based on the vehicle location and a target location.

2. Any of the preceding embodiments, where determining the vehicle location comprises calculating the vehicle location based on a horizontal distance of the aerial vehicle to each object and a corresponding latitude and a corresponding longitude of each object.

3. Any of the preceding embodiments, further comprising: receiving, at the aerial vehicle, a plurality of images recorded by the camera on board the aerial vehicle as the aerial vehicle is flying over a plurality of locations; inputting the plurality of images into the machine learning model to detect a corresponding plurality of objects with each image; determining a corresponding object location of each object within each corresponding plurality of objects; and generating the electronic map based on each corresponding plurality of objects, wherein the electronic map comprises the corresponding object location of each object, a corresponding object shape associated with each object, and a plurality of colors associated with each object, the plurality of colors representing pixel colors of each corresponding object with the image.

4. Any of the preceding embodiments, further comprising: determining, at the aerial vehicle during flight, that a global positioning system is unavailable; and based on determining that the global positioning system is unavailable, positioning the camera in a downward direction and instructing the camera to initiate image recording.

5. Any of the preceding embodiments, wherein generating the flight instruction based on the vehicle location and the target location comprises: accessing a flight path for the aerial vehicle, wherein the flight path comprises a set of objects within the electronic map; determining one or more map objects that correspond to the one or more objects; identifying, based on the one or more map objects, a next object in the flight path; and instructing the aerial vehicle to navigate to the next object.

6. Any of the proceeding embodiments, wherein determining the one or more map objects that correspond to the one or more objects further comprises: detecting, within the image using the machine learning model, a cluster of objects within a corresponding location within the image; comparing each object within the cluster of objects with each object within the electronic map; and determining, based on comparing each object within the cluster of objects with each object within the electronic map, a matching cluster of map objects.

7. Any of the preceding embodiments, wherein determining the vehicle location for the aerial vehicle further comprises: determining a corresponding horizontal distance between the aerial vehicle and each of the one or more objects; and estimating the vehicle location based on each corresponding horizontal distance.

8. A tangible, non-transitory, machine-readable medium storing instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

11. A system comprising cloud-based circuitry for performing any of embodiments 1-7.

What is claimed is:

1. A system for adjusting flight paths using terrain guidance, the system comprising:
one or more processors; and
one or more non-transitory, computer-readable storage media storing instructions, which, when executed by the one or more processors, cause the one or more processors to perform operations comprising:
receiving, at an aerial vehicle, an image recorded by a camera on board the aerial vehicle, wherein the camera is configured to record images of terrain below the aerial vehicle;
inputting the image into a machine learning model to detect a first plurality of objects with the image, wherein the machine learning model is trained to detect objects within received images, and wherein the machine learning model outputs a corresponding shape representing each object and one or more colors representing pixels of each object;
retrieving an electronic map comprising a second plurality of objects, wherein each object within the second plurality of objects is associated with a location comprising a latitude and a longitude, and wherein each object of the second plurality of objects is represented by a corresponding stored shape and a corresponding stored one or more colors;
determining, based on each corresponding color and each corresponding shape, whether one or more objects within the first plurality of objects match the one or more objects within the second plurality of objects;
in response to determining that the one or more objects within the first plurality of objects match the one or more objects within the second plurality of objects, retrieving object locations for the one or more objects;

determining, based on the object locations for the one or more objects, a vehicle location for the aerial vehicle, wherein the vehicle location is calculated based on a horizontal distance to each object and a corresponding latitude and a corresponding longitude of each object; and generating a flight instruction based on the vehicle location and a target location.

2. The system of claim 1, wherein the instructions further cause the one or more processors to perform operations comprising:

receiving, at the aerial vehicle, a plurality of images recorded by the camera on board the aerial vehicle as the aerial vehicle is flying over a plurality of locations;

inputting the plurality of images into the machine learning model to detect a corresponding plurality of objects with each image;

determining a corresponding object location of each object within each corresponding plurality of objects; and generating the electronic map based on each corresponding plurality of objects, wherein the electronic map comprises the corresponding object location of each object, a corresponding object shape associated with each object, and a plurality of colors associated with each object, the plurality of colors representing pixel colors of each corresponding object with the image.

3. The system of claim 1, wherein the instructions further cause the one or more processors to perform operations comprising:

determining, at the aerial vehicle during flight, that a global positioning system is unavailable; and based on determining that the global positioning system is unavailable, positioning the camera in a downward direction and instructing the camera to initiate image recording.

4. The system of claim 1, wherein the instructions for determining the vehicle location for the aerial vehicle further cause the one or more processors to perform operations comprising:

determining a corresponding horizontal distance between the aerial vehicle and each of the one or more objects; and estimating the vehicle location based on each corresponding horizontal distance.

5. The system of claim 1, wherein the instructions for generating the flight instruction based on the vehicle location and the target location further cause the one or more processors to perform operations comprising:

accessing a flight path for the aerial vehicle, wherein the flight path comprises a set of objects within the electronic map;

determining one or more map objects that correspond to the one or more objects;

identifying, based on the one or more map objects, a next object in the flight path; and instructing the aerial vehicle to navigate to the next object.

6. The system of claim 5, wherein the instructions for determining the one or more map objects that correspond to the one or more objects further cause the one or more processors to perform operations comprising:

detecting, within the image using the machine learning model, a cluster of objects within a corresponding location within the image;

comparing each object within the cluster of objects with each object within the electronic map; and determining, based on comparing each object within the cluster of objects with each object within the electronic map, a matching cluster of map objects.

7. The system of claim 6, wherein the instructions for identifying, based on the one or more map objects, the next object in the flight path cause the one or more processors to perform operations comprising:

matching the one or more map objects of the matching cluster of map objects with one or more flightpath objects; and determining the next object based on an indication of a following object within the one or more flightpath objects.

8. The system of claim 1, wherein the instructions further cause the one or more processors to perform operations comprising:

receiving, at the aerial vehicle during flight, a global positioning system signal, wherein the global positioning system signal is used to determine a position of the aerial vehicle;

determining, based on the global positioning system signal, a set of objects within the electronic map that are within a threshold distance of the aerial vehicle;

identifying the set of objects within the image;

calculating, using image characteristics and camera characteristics, a distance from the aerial vehicle to each object within the set of objects;

determining aerial vehicle altitude based on the distance to each object of the set of objects; and based on the aerial vehicle altitude and a received altitude associated with the position, determining whether the position is inaccurate.

9. The system of claim 1, wherein the instructions further cause the one or more processors to perform operations comprising:

receiving, at the aerial vehicle during flight, a global positioning system signal, wherein the global positioning system signal is used to determine a position of the aerial vehicle;

navigating the aerial vehicle to fly above a first object within the first plurality of objects;

determining an object location of the first object; and determining, based on the object location, whether the position is accurate.

10. A method comprising:

receiving an image recorded by a camera on board an aerial vehicle, wherein the image shows terrain below the aerial vehicle;

inputting the image into a machine learning model to detect a first plurality of objects with the image, wherein the machine learning model is trained to detect objects within received images;

retrieving an electronic map comprising a second plurality of objects, wherein each object within the second plurality of objects is associated with a location;

detecting, within the image using the machine learning model, a cluster of objects within a corresponding location within the image;

comparing each object within the cluster of objects with each object within the electronic map;

determining, based on comparing each object within the cluster of objects with each object within the electronic map, a matching cluster of map objects;

in response to determining the matching cluster of map objects, determining, based on an object location of the matching cluster of map objects, a vehicle location for the aerial vehicle; and generating a flight instruction based on the vehicle location and a target location.

11. The method of claim 10, where determining the vehicle location comprises calculating the vehicle location based on a horizontal distance of the aerial vehicle to each object and a corresponding latitude and a corresponding longitude of each object.

12. The method of claim 10, further comprising:
receiving, at the aerial vehicle, a plurality of images recorded by the camera on board the aerial vehicle as the aerial vehicle is flying over a plurality of locations;
inputting the plurality of images into the machine learning model to detect a corresponding plurality of objects with each image;
determining a corresponding object location of each object within each corresponding plurality of objects; and
generating the electronic map based on each corresponding plurality of objects, wherein the electronic map comprises the corresponding object location of each object, a corresponding object shape associated with each object, and a plurality of colors associated with each object, the plurality of colors representing pixel colors of each corresponding object with the image.

13. The method of claim 10, further comprising:
determining, at the aerial vehicle during flight, that a global positioning system is unavailable; and
based on determining that the global positioning system is unavailable, positioning the camera in a downward direction and instructing the camera to initiate image recording.

14. The method of claim 10, wherein determining the vehicle location for the aerial vehicle further comprises:
determining a corresponding horizontal distance between the aerial vehicle and the matching cluster of map objects; and
estimating the vehicle location based on each corresponding horizontal distance.

15. The method of claim 10, wherein generating the flight instruction based on the vehicle location and the target location comprises:
accessing a flight path for the aerial vehicle, wherein the flight path comprises a set of objects within the electronic map;
determining map objects that correspond to the matching cluster of map objects;
identifying, based on the map objects, a next object in the flight path; and
instructing the aerial vehicle to navigate to the next object.

16. One or more non-transitory, computer-readable media storing instructions thereon, wherein the instructions cause one or more processors to perform operations comprising:
inputting an image into a machine learning model to detect a first set of objects with the image, wherein the machine learning model is trained to detect objects within received images, and wherein the image shows terrain below an aerial vehicle;
accessing an electronic map comprising a second set of objects, wherein each object within the second set of objects is associated with a location;
detecting, within the image using the machine learning model, a cluster of objects within a corresponding location within the image;
comparing each object within the cluster of objects with each object within the electronic map;
determining, based on comparing each object within the cluster of objects with each object within the electronic map, a matching cluster of map objects;
in response to determining the matching cluster of map objects, determining, based on an object location of the matching cluster of map objects, a vehicle location for the aerial vehicle; and
generating a flight instruction based on the vehicle location and a target location.

17. The one or more non-transitory, computer-readable media of claim 16, wherein the instructions further cause the one or more processors to perform operations comprising:
receiving a plurality of images recorded by a camera on board the aerial vehicle as the aerial vehicle is flying over a plurality of locations;
inputting the plurality of images into the machine learning model to detect a corresponding plurality of objects with each image;
determining a corresponding object location of each object within each corresponding plurality of objects; and
generating the electronic map based on each corresponding plurality of objects, wherein the electronic map comprises the corresponding object location of each object, a corresponding object shape associated with each object, and a plurality of colors associated with each object, the plurality of colors representing pixel colors of each corresponding object with the image.

18. The one or more non-transitory, computer-readable media of claim 16, wherein the instructions for generating the flight instruction based on the vehicle location and the target location further cause the one or more processors to perform operations comprising:
accessing a flight path for the aerial vehicle, wherein the flight path comprises a set of objects within the electronic map;
determining one or more map objects within the set of objects;
identifying, based on the one or more map objects, a next object in the flight path; and
instructing the aerial vehicle to navigate to the next object.

* * * * *